Sept. 20, 1932.　　　　P. H. DOWLING　　　　1,878,764
ELECTRICAL TRANSLATING APPARATUS
Original Filed June 20, 1928
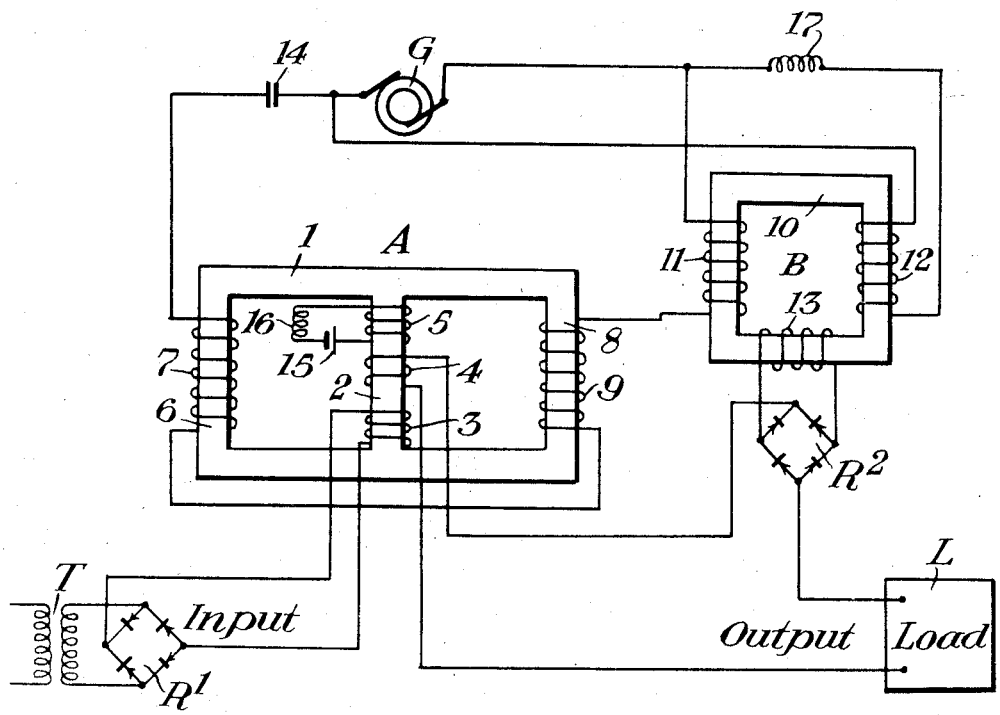
INVENTOR:
P. H. Dowling,
by A. R. Vencill.
His Attorney Patented Sept. 20, 1932

1,878,764

UNITED STATES PATENT OFFICE

PHILIP H. DOWLING, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRICAL TRANSLATING APPARATUS

Original application filed June 20, 1928, Serial No. 286,984. Divided and this application filed July 9, 1929. Serial No. 377,020.

My invention relates to electrical translating apparatus of the amplifier type.

One object of my invention is the provision of amplifying apparatus having no electron tubes and no moving parts.

The present application is a division of my co-pending application, Serial No. 286,984, filed June 20, 1928, for electrical translating apparatus.

I will describe one form of electrical translating apparatus embodying my invention, and will then point out the novel features thereof in claims.

The accompanying drawing is a diagrammatic view illustrating one form of translating apparatus embodying my invention.

Referring to the drawing, the reference character A designates a transformer comprising a magnetizable core 1 having a bridging member 2 provided with three windings 3, 4, and 5. One leg 6 of this core is provided with a winding 7, and the other leg 8 carries a winding 9. Winding 3 is included in an input circuit which also includes a source of direct current here shown as the secondary of a transformer T and a full wave rectifier $R^1$. Alternating current is at times supplied to the primary of transformer T, and it will be seen that when current is supplied to this primary, unidirectional current will be supplied to winding 3.

Associated with transformer A is a second transformer B comprising a core 10 having three windings 11, 12 and 13. Winding 11 is connected in series with windings 7 and 9 of transformer A in a circuit which is constantly supplied with alternating current from a suitable source such as an alternator G. This circuit may be tuned to resonance by a condenser 14. The windings 7 and 9 are so disposed that at any instant the fluxes created by currents in these windings are in opposition in the bridging member 2, and it follows that under normal conditions no electromotive force is induced in windings 3, 4 and 5. Winding 4 of transformer A is connected in series with a load L in an output circuit which is supplied with current through a rectifier $R^2$ from winding 13 of transformer B.

Winding 12 of transformer B is supplied with alternating current from alternator G through an impedance 17, the parts being so adjusted that under normal conditions the alternating flux created in core 10 by current in winding 11 is exactly neutralized by the alternating flux created in this core by winding 12. Under these conditions, then, there is no electromotive force induced in winding 13 and there is no current in the output circuit including the load L. When the current supplied to the input circuit is increased, however, the increased unidirectional current in winding 3 decreases the permeability of the bridging member 2. Since this member is included in the magnetic circuits for the fluxes linking both windings 7 and 9, this change in permeability causes a decrease in the reactance of windings 7 and 9. As a result, the current through these windings, and hence through winding 11 of transformer B, increases, but there is no change in the current through winding 12 of transformer B. As a result, the balance normally existing between the fluxes induced in core 10 of transformer B is destroyed, and the resultant alternating flux in this core induces an electromotive force in winding 13. A unidirectional current is therefore supplied to the load L and winding 4 in series. The disposition of the parts is such that the unidirectional flux caused by the current thus supplied to winding 4 aids the unidirectional flux created in member 2 by current in winding 3. The effect of the current in the output circuit is therefore to still further decrease the permeability of bridging member 2. This change in permeability decreases the reactance of windings 7 and 9 and increases the current in winding 11 of transformer B, thereby increasing the current in the output circuit. This operation continues until a condition of equilibrium has been reached. It will be clear from the foregoing that when the input current returns to its original value, the output current also returns to its original value, the functioning of the apparatus being apparent without tracing the sequence of operations in detail.

The sensitivity of the apparatus depends, of course, upon the initial permeability of core 1, and for the purpose of adjusting this permeability to its optimum value, I connect winding 5 of transformer A in series with a battery 15 and a reactor 16. The current supplied to winding 5 by battery 15 creates in core 1 a unidirectional flux, the magnitude of which is such as to bring the initial permeability of this core to the desired value. The purpose of reactor 16 is to increase the impedance of the circuit including winding 5 to transient currents, thereby preventing this circuit from absorbing energy when the current in the input circuit is varied.

It should be pointed out that with apparatus embodying my invention, the current in the output circuit is varied in accordance with the current supplied to the input circuit, and that the apparatus operates regeneratively in response to comparatively small changes in the input circuit to cause enormously larger changes in the output current. Furthermore, this operation is accomplished without the use of moving parts. Apparatus embodying my invention is particularly suitable for, though in no way limited to, use in railway traffic controlling apparatus in which the train is supplied with a device such as a relay which is supplied with current in accordance with variations in the current flowing in a track rail. In my present invention the train carried relay could be substituted for the load L and the track rail would correspond to the primary of transformer T. The relay would then be energized in accordance with the trackway current.

It should be distinctly understood, however, that my invention is not limited to use with input circuits supplied by an alternating current source. When the input energy is direct current, this current may be supplied directly to the control winding 3, the rectifier $R^1$ and transformer T being unnecessary.

Although I have herein shown and described only one form of electrical translating apparatus embodying my invention, it is understood that various changes and modifications may be made therein within the scope of the appended claims without departing from the spirit and scope of my invention.

Having thus described my invention, what I claim is:

1. In combination, a first transformer comprising two magnetic paths having a member in common, a first and a second winding in inductive relation with said two paths respectively, a magnetizable core carrying a third winding; a first circuit including a source of alternating current and said first, second, and third windings in series in such manner that the fluxes created in said member are in opposition; means for at times varying the permeability of said two paths, a fourth winding on said core supplied with alternating current and so disposed that the fluxes created in said core by currents in said third and fourth windings are in opposition, a fifth winding on said core, a sixth winding on said member, a rectifier, and an output circuit including said sixth winding and receiving energy from said fifth winding through said rectifier.

2. In combination, a first transformer comprising two magnetic paths having a member in common, a first and a second winding in inductive relation with said two paths respectively, a magnetizable core carrying a third winding; a first circuit including a source of alternating current and said first, second and third windings in series in such manner that the fluxes created in said member are in opposition; means for creating a unidirectional flux in said member, means for at times creating an additional unidirectional flux in said member to vary the impedances of said first and second windings, a fourth winding on said core supplied with alternating current and so disposed that the fluxes created in said core by currents in said third and fourth windings are in opposition, a fifth winding on said core, a sixth winding on said member, a rectifier, and an output circuit including said sixth winding and receiving energy from said fifth winding through said rectifier, said sixth winding being connected in said circuit in such manner that the flux created in said member by current in said winding aids the flux created in said member by both said means.

3. In combination, a transformer having a primary and a secondary, an iron core reactor comprising two magnetic circuits having a common member, two windings one on each said circuit and connected in series with said primary and a source of periodic current, means for at times varying the flux in said common member, means responsive to current in said secondary for also varying the flux in said common member, and a load receiving energy from said secondary.

4. In combination, a transformer having a primary and a secondary, an iron core reactor comprising two magnetic circuits having a common member, two windings one on each said circuit and connected in series with said primary and a source of periodic current, a third winding on the common member, means for supplying current to said third winding to vary the electromotive force induced in said secondary, and means responsive to the electromotive force induced in said secondary to vary the flux in said common member.

5. In combination with a transformer having a secondary and two primaries, a core provided with a winding, a source of periodic current connected with one said primary and said winding in series, an input circuit arranged when supplied with current to vary the impedance of said winding, means for supplying periodic current to the remaining primary to oppose the flux created in the transformer by current in said one primary, and means responsive to the electromotive force induced in said secondary to control the impedance of said winding.

6. In combination, a transformer having a secondary and two primaries, an iron core reactor having a winding, a circuit including a source of periodic current and said winding and one of said primaries in series, an impedance, means for supplying periodic current to said impedance and the remaining primary in series to oppose the flux created in said transformer by current in said one primary, an input circuit for controlling the flux in the core of said reactor, and means responsive to the electromotive force induced in said secondary for controlling the flux in the core of said reactor.

In testimony whereof I affix my signature.

PHILIP H. DOWLING.